United States Patent [19]
Ben-Nun et al.

[11] Patent Number: 5,483,526
[45] Date of Patent: Jan. 9, 1996

[54] RESYNCHRONIZATION METHOD AND APPARATUS FOR LOCAL MEMORY BUFFERS MANAGEMENT FOR AN ATM ADAPTER IMPLEMENTING CREDIT BASED FLOW CONTROL

[75] Inventors: Michael Ben-Nun, Jerusalem, Israel; Kadangode K. Ramakrishnan, Maynard, Mass.

[73] Assignee: Digital Equipment Corporation, Maynard, Mass.

[21] Appl. No.: 277,823

[22] Filed: Jul. 20, 1994

[51] Int. Cl.$^6$ ............................................. H04L 12/56
[52] U.S. Cl. ................................. 370/60.1; 370/94.2
[58] Field of Search ........................... 370/54, 58.1, 58.2, 370/58.3, 60, 60.1, 61, 79, 82, 94.1, 94.2, 100.1, 105.1

[56] References Cited

U.S. PATENT DOCUMENTS

| | | | |
|---|---|---|---|
| 5,101,404 | 3/1992 | Kunimoto et al. | 370/60 |
| 5,113,392 | 5/1992 | Takiyasu et al. | 370/94.1 |
| 5,280,476 | 1/1994 | Kojima et al. | 370/60.1 |
| 5,285,446 | 2/1994 | Yonehara | 370/60.1 |
| 5,311,509 | 5/1994 | Heddes et al. | 370/60 |
| 5,379,297 | 1/1995 | Glover et al. | 370/60.1 |

*Primary Examiner*—Alpus Hsu
*Attorney, Agent, or Firm*—Kenneth F. Kozik

[57] ABSTRACT

An asynchronous transfer mode (ATM) network device having a receiver portion, the receiver portion capable of receiving ATM cells on virtual circuits (VCs) from an upstream ATM switch, a local memory used to store the ATM cells, managing local memory using queues, assembling ATM cells into packets, transmitting the packets to a host memory, resynchronizing ATM credits, and a transmitter portion, the transmitter portion indicating transmitting of packets to host memory to the upstream ATM switch.

27 Claims, 8 Drawing Sheets

RESYNCHRONIZATION METHOD AND APPARATUS FOR LOCAL MEMORY BUFFERS MANAGEMENT FOR AN ATM ADAPTER IMPLEMENTING CREDIT BASED FLOW CONTROL

FIELD OF THE INVENTION

This invention relates generally to the field of computer networks, and more particularly to a method and apparatus for a resynchronization of a local memory buffer management scheme for an asynchronous transfer mode (ATM) adapter implementing flow control.

BACKGROUND OF THE INVENTION

In general terms, a computer network is a collection of end systems (also known as nodes) interconnected through one or more communication links. Generally, the end systems both send data to other end systems on the network and receive data sent by other end systems on the network. When an end system is a sender of data, it is referred to as a source for that data; when it is a receiver of data, it is referred to as a destination for the data. Typically, end systems act as both sources and destinations depending on whether they are sending or receiving data. When acting as a source, the system typically sends data in the form of messages over a communication link. Messages can flow back and forth to other communication links and end systems within the network through bridges or routers, which are used to interconnect multiple communication links.

Each message comprises a sequence of bits. Typically, messages sent over a network are divided up into smaller blocks of information called packets. The flow of packets in the network is usually referred to as traffic. An important design objective in networks is controlling traffic so that individual packets will not be transmitted at a faster rate than they can be processed by the communication links, or intermediate systems such as bridges or routers, through which the packets will pass, or by the destinations.

Asynchronous transfer mode (ATM) is one of the general class of digital switching technologies that relay and route traffic by means of a virtual circuit identifier (VCI) contained within the cell. Unlike common packet technologies, such as X.25 or frame relay, ATM uses very short, fixed length units of information, called cells. In applications utilizing ATM, packets at a source are first broken up into these fixed length packets (ATM cells), transmitted, and then reassembled at a destination. ATM cells are 53 bytes long. They consist of a 5-byte header (containing an identifier of data flow which implicitly identifies the source address and the destination address) and a 48-byte information field. The header of an ATM cell contains all the information the network needs to relay the cell from one node to the next over a pre-established route. User data is contained in the remaining 48 bytes.

ATM uses a concept of virtual networking (or channels) to pass traffic between two locations, establishing virtual connections between a pair of ATM end-systems which are needed to connect a source with a destination. These connections are termed "virtual" to distinguish them from dedicated circuits. ATM cells always traverse the same path from source to destination. However, ATM does not have to reserve the path for one user exclusively. Any time a given user is not occupying a link, another user is free to use it.

ATM connections exist only as sets of routing tables held in each network node, switch, or other intermediate system, based on the virtual circuit identifier (VCI) and virtual path identifier (VPI) contained in the cell header. When a virtual path is established, each node (or switch) is provided with a set of lookup tables that identify an incoming cell by header address, route it through the node to the proper output port, and overwrite the incoming VCI/VPI with a new one that the next node along the route will recognize as an entry in its routing table.

The cell is thus passed from switch to switch over a prescribed route, but the route is "virtual" since the facility carrying the cell is dedicated to it only while the cell traverses it. Two cells that are ultimately headed for different destinations may be carried, one after the other, over the same physical wire for a common portion of their journey.

With ATM, the successful transmission of packets from a source to a destination requires successful delivery of all the ATM cells formed from the original information packet. If any one cell is lost, the entire packet must be re-transmitted again. When the ATM station repeatedly tries to resend the original information packet, the network becomes increasingly loaded as more network congestion occurs and more cells are lost. As a result, ATM networks can operate efficiently when there is no cell loss.

A common method of controlling traffic, also known as flow control, is called the credit-based, per hop, per virtual circuit (VC) flow control. This method allows the network links to operate near full capacity without cell loss or instability. ATM credit based flow control requires that a cell not be transmitted on a communication link unless the sender knows that a buffer is available at the receiver to hold the cell. The sender maintains a "credit balance" for each virtual circuit (VC). As cells are sent, the sender decrements the balance, and refrains from sending a new cell if the balance is zero. When the receiver forwards a cell (thereby freeing a buffer), it transmits to the sender a credit. The sender and receiver in hop by hop flow control are on either side of the communications link.

During the transmission of ATM cells, numerous events may occur in the sender that cause its credit balance to be depleted to zero prior to the complete transmission of all ATM cells. If such an event occurs, the sender will cease sending ATM cells on a virtual circuit (VC) to the receiver until its credit balance becomes nonzero. If no ATM cells have been lost, and the sender and the receiver are otherwise operating normally, this credit balance will be replenished by the receiver and then the sender progresses in transmitting its cells. However, if there is an error, either on the link, the sender, or the receiver, these credits may not be replenished back sufficiently. This results in the link not being utilized adequately or, under extreme conditions, the sender may not get any credits back at all and therefore may be unable to transmit any ATM cells subsequently. Thus, the sender and the receiver do not get back in synchrony and the sender never gets back its full level of credits to use the link efficiently.

A method of resynchronizing the interaction between the sender and the receiver is needed to allow the successful continuation of the transmission of the ATM cells, using the link as efficiently as possible.

SUMMARY OF THE INVENTION

In accordance with the present invention, An asynchronous transfer mode (ATM) network device is provided having a receiver portion, said receiver portion capable of receiving a plurality of ATM cells on one of a plurality of virtual circuits (VCs) from an upstream ATM switch, a local memory, said local memory used to store the plurality of ATM cells, means for managing said local memory using a plurality of queues, means for assembling ATM cells into a plurality of packets, means for transmitting said plurality of packets to a host memory, means for resynchronizing a plurality of ATM credits, and a transmitter portion, said transmitted portion having a means for indicating said transmitting of said packets to said host memory to said upstream ATM switch.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
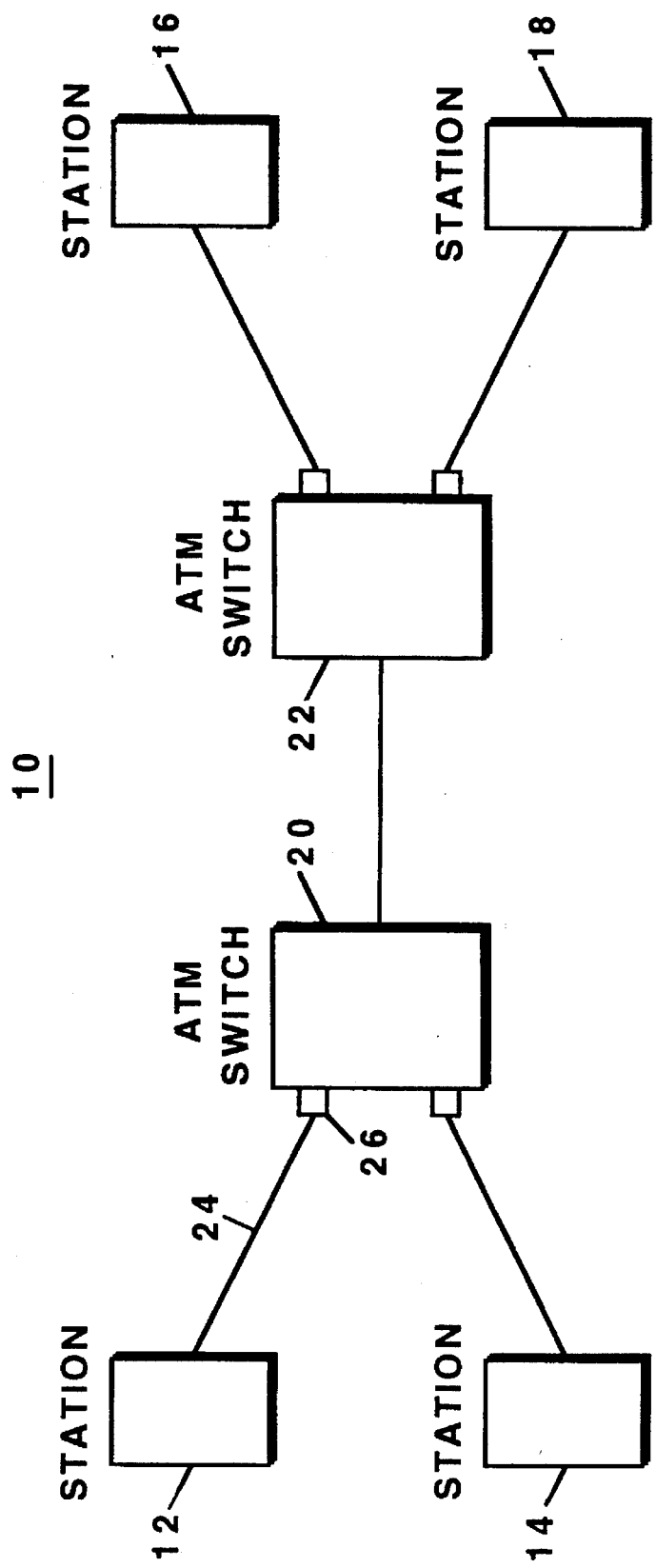
FIG. 1 is a block diagram showing an exemplary asynchronous transfer mode (ATM) local area network (LAN)

Referring to FIG. 1, an exemplary asynchronous transfer mode (ATM) local area network (LAN) 10 is shown to include four stations labeled as 12, 14, 16, and 18, respectively. The ATM LAN 10 is also shown to include two ATM switches labeled as 20 and 22, respectively. An ATM adapter resides in each of the stations 12, 14, 16, and 18. By way of example, if station 12 is transmitting packets for station 16, the ATM adapter in station 12 is involved in segmenting the packets into cells, and affixing the appropriate fields in a cell header (of FIG. 2 and FIG. 3). The ATM adapter in station 16 is involved in reassembling the cells received into a complete packet and delivering the packet to station 16. Control of the ATM LAN 10 resides in the ATM switches 20 and 22, which route messages between stations and control access in the event of congestion. For example, the station 12 may send a cell over a line 24 to ATM switch 20 through port 26. ATM switch 20 will route the cell to a destination, Station 16, for example, according to a VCI/VPI in an ATM cell header (more fully described with reference to FIG. 2 and FIG. 3).

Because each port 26 is dedicated to one station 12, other stations (14 for example) do not have to contend for access to the ATM switch 20. Thus, the station 12 has full access to the line 24 regardless of the activity of other stations with other such connections. For example, if a 5 Mb file is being transmitted from station 12 to station 16, it can move to the ATM switch 20 in a continuous burst at the full channel rate, instead of sharing the communication link in the other stations and having intervening frames from other stations as with other LANs, such as Ethernet, Token Ring, and Fiber Distributed Data Interface (FDDI) LANs.

Figure 2:
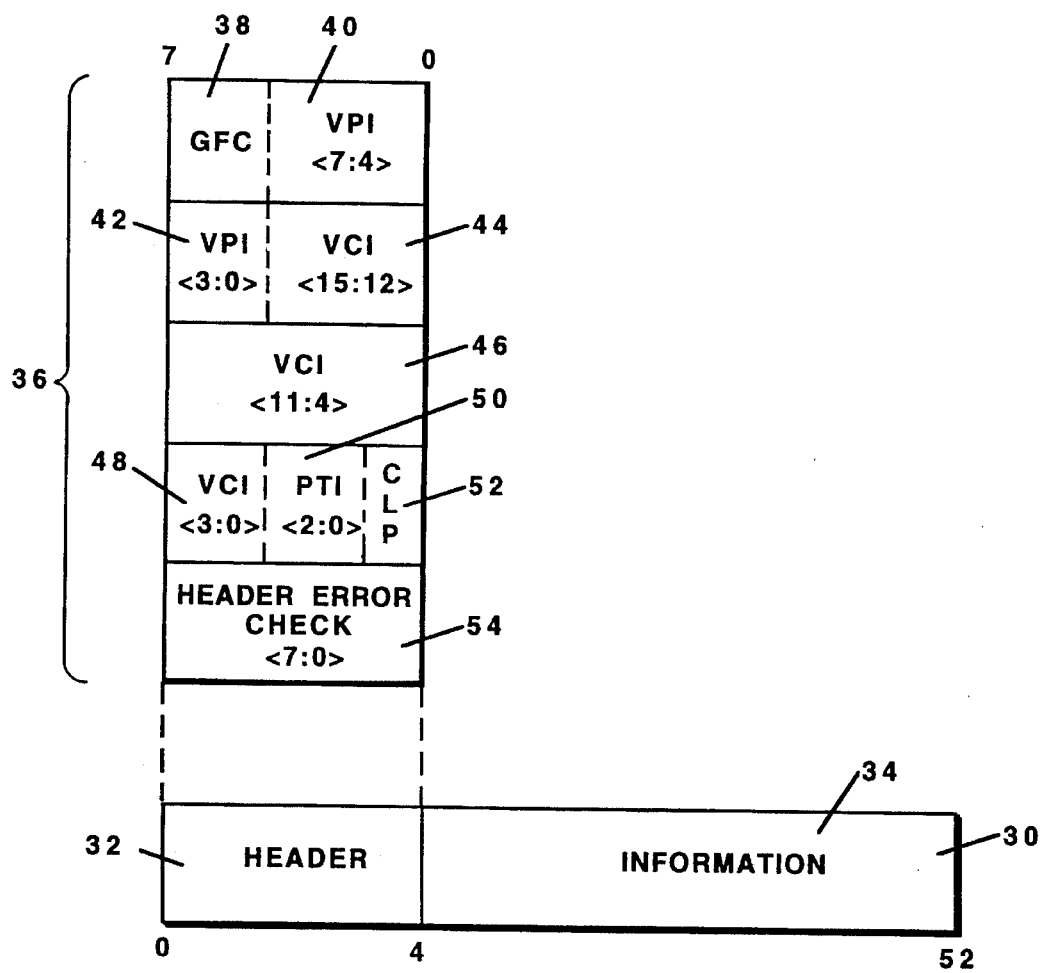
FIG. 2 is a block diagram showing an ATM cell.

Each message in the ATM LAN 10 is comprised of one or more fixed length units of data called ATM cells. Referring to FIG. 2, an ATM cell 30 is shown to be 53 bytes long. The ATM cell 30 is typically divided into a 5-byte header 32 and a 48-byte information field 34. The 5-byte header 32 contains several fields 36. Specifically, a first byte contains a generic flow control (GFC) field 38 and part of a virtual path identifier (VPI) field 40. A second byte contains another part of the VPI field 42 and part of a virtual channel identifier (VCI) field 44. A third byte contains another part of the VCI field 46. A fourth byte contains the remaining part of the VCI field 48, a payload type identifier (PTI) field 50, and a cell loss priority field (CLP) 52. A fifth byte contains a header error check 54.

The address of the ATM cell 30 is contained in the fields labeled VPI (40 and 42) and VCI (44, 46, and 48). This two-part identification allows the ATM LAN 10 (of FIG. 1) to route data contained in the information field 34 between locations while maintaining the identity of individual circuits within a trunk.

Figure 3:
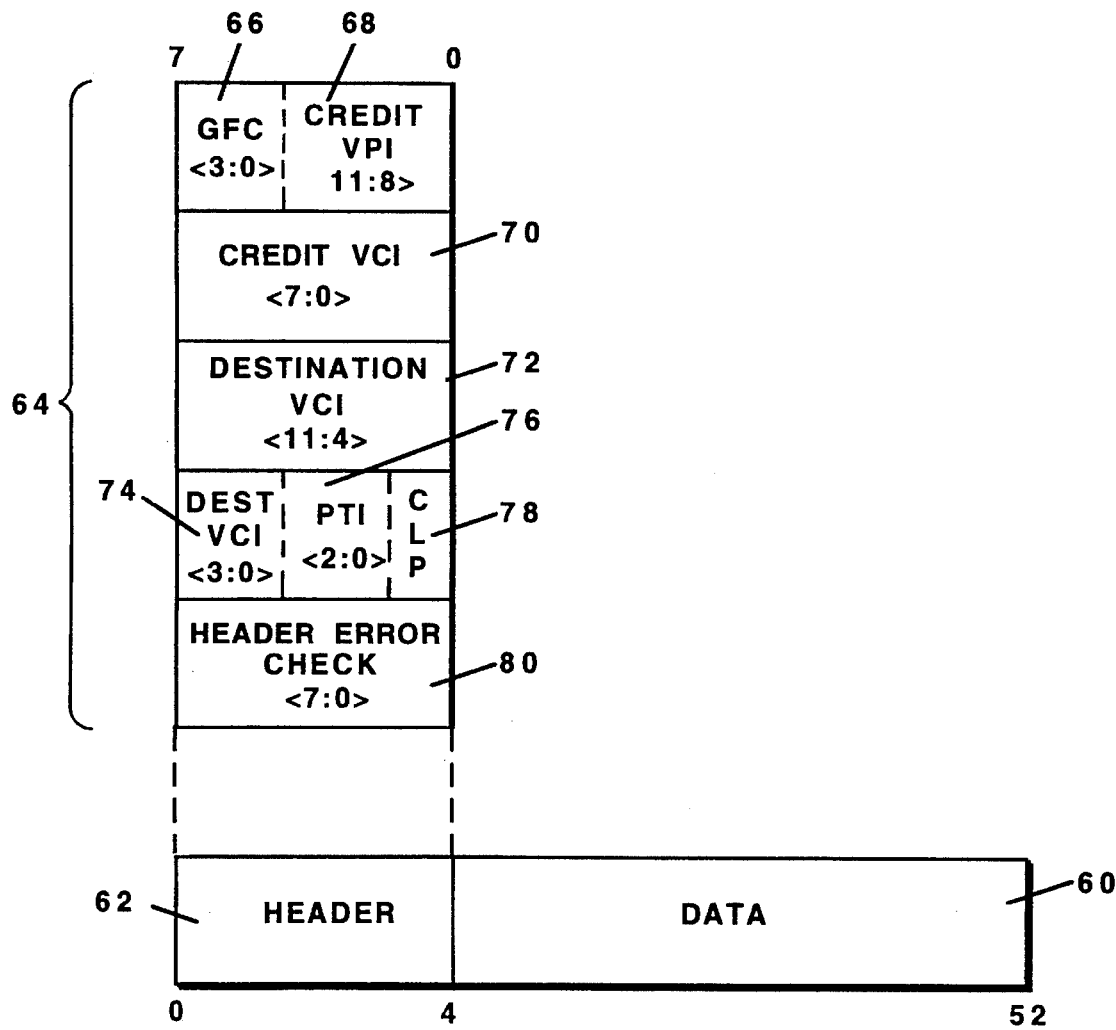
FIG. 3 is a block diagram showing an ATM cell which includes a credit field.

Referring to FIG. 3, an alternative header 62 of an ATM cell 60 is shown. The header 62 is 5 bytes long and contains several fields 64. Specifically, a first byte contains a GFC field 66 and a part of credit virtual circuit identifier (credit VCI) 68. A second byte contains another part of the credit VCI 70. A third byte contains part of a destination VCI 72. A fourth byte contains a remaining part of the destination VCI 74, a PTI field 76, and a CLP field 78. A fifth byte contains a header error check field 80.

As mentioned above, with any LAN, network-based applications in one station create packets for transmission to other stations. The ATM LAN 10 breaks packets into fixed-size (53 bytes) cells before they are transmitted. For network equipment designers, the challenge with small cells is that loss of any single cell destroys the entire packet of which it is a part. For example, a 9180 byte packet is broken into 192 ATM cells (48 bytes of data per ATM cell). The loss of any one cell because of congestion in the network (communication link or intermediate switches) requires retransmission of all 192 ATM cells. The loss of cells, and the corollary loss of packets, is bad enough, but more significant impact is that these lost packets are now retransmitted into the congested network, causing more congestion and more cell loss. This creates an inherently unstable feedback loop of congestion, cell loss, more congestion, and more cell loss. This snowball effect can lead to a state of the network called "throughput collapse." Most of the newly transmitted packets are thus destined for congestion and discard.

One way to reduce the probability of cell loss is to use ATM's ability to reserve bandwidth. Each application can have a virtual circuit (VC) established through each ATM link and ATM adapter with guaranteed bandwidth. This can avoid cell loss but only at a very high cost. For example, when 100 stations set up VCs to a server using a 155 Mbps link, each VC will have only about 1.5 Mbps bandwidth to access the server. While this is suitable for applications generating a steady flow of information, it is generally not true of data applications to generate cells at such a rate. Data applications generate cells in a bursty fashion, and hence leave some of the above allocated bandwidth unusable. This leads to inefficient use of the link.

To avoid the above inefficiencies and to provide a high performance ATM LAN 10, a means of controlling the flow of cells (known as flow control) based on a link-by-link system of control was designed. This design is based on credits and buffers per VC.

Figure 4:
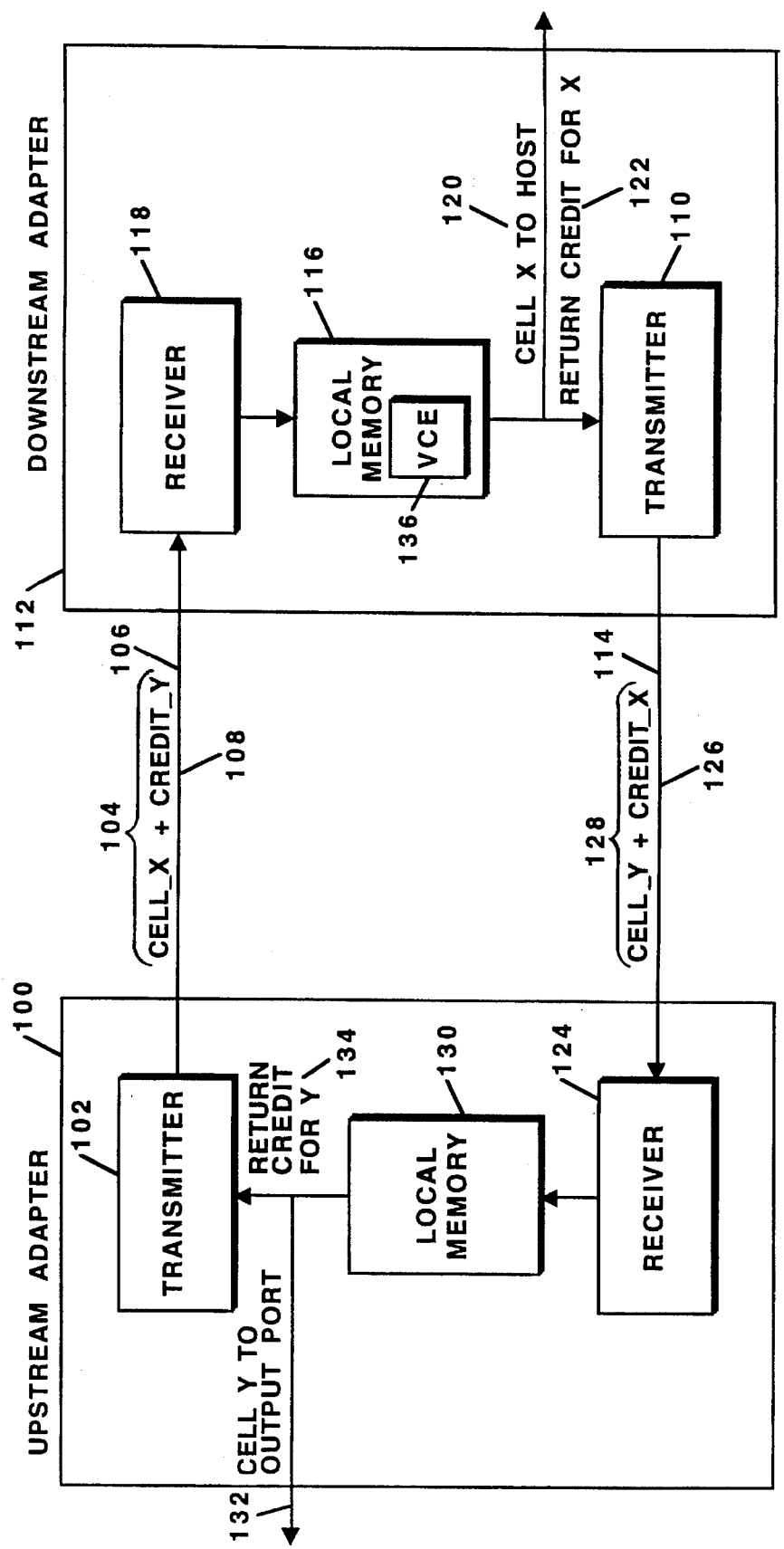
FIG. 4 is a block diagram showing memory management of a credit-based ATM flow control mechanism in accordance with one embodiment of the present invention.

Referring to FIG. 4, an exemplary credit-based ATM flow control system is illustrated. In the exemplary credit-based ATM flow control system a transmitter portion 102 of an upstream ATM switch 100 is sending an ATM cell 104 on virtual circuit identifier (VCI) 106. The credit field 108 in ATM cell 104 is carrying a credit for a transmitter portion 110 of a downstream ATM adapter 112 for VCI 114. A "credit" is simply an okay to send one or more ATM cells on a VCI, with the assurance that the cell(s) will have a buffer at the remote end and hence not experience loss.

In the exemplary credit-based ATM flow control system of FIG. 4, when the downstream ATM adapter 112 moves the ATM cell 104 of VCI 106 from its local memory 116 from a receiver portion 118 and into a host memory 120, the downstream ATM adapter 112 generates a credit 122 for the transmitter portion 102 of the upstream ATM switch 100 to allow transmission of a new ATM cell (not shown) on VCI 106. This credit for the transmitter portion 102 can be carried by any ATM cell transmitted by the transmitter portion 110 of the downstream ATM adapter 112 to a receiver portion 124 of the upstream ATM switch 100. For example, in FIG. 4 a credit 126 for VCI 106 is carried on an ATM cell 128 on VCI 114.

The receiver portion 124 of the upstream ATM switch 100 receives the ATM cell 128 from the transmitter portion 110 of the downstream ATM adapter 112 and stores it in its local memory 130. The upstream ATM switch 100 uses the credit 126 to transmit another cell on VCI 106. When the upstream ATM switch 100 moves the ATM cell 128 from its local memory 130 to one of its output ports 132, the upstream ATM switch 100 generates a credit 134 for VCI 114, which will be carried by any ATM cell transmitted towards the downstream ATM adapter 112.

In order to be able to maintain a full link speed for each virtual circuit, it is necessary to provide each transmit VC with an initial fixed number of credits. This number should be large enough to ensure that the transmitter portion 102 of an upstream ATM switch 100 will not stop transmitting before the upstream ATM switch 100 receives a first credit from the transmitter portion 110 of the downstream ATM adapter 112. Thus, the receiver portion 118 of the downstream ATM adapter 112 should have enough local memory 116 to accommodate a number of cells corresponding to the transmission of initial credits given to the upstream ATM switch 100.

In credit-based ATM flow control, which is described fully with reference to FIG. 4, the credit VCI field (68 and 70) of each arriving ATM cell 60 (of FIG. 3) identifies the transmit virtual circuit (VC) which is given a new credit for transmission from a transmitter to a receiver. After moving out this newly arrived ATM cell 60 from its memory buffer, the receiver should return a credit to the sender. The virtual circuit whose credit is returned is for the one that this ATM cell 60 was sent on, i.e., the value of the VCI field (72 and 74). Transmitting or receiving credits may be done one credit per an ATM cell 60, or in a scheme that may provide a plurality of credits per an ATM cell 60.

An arriving ATM cell 60 may be a null cell. This is indicated by a destination VCI (72 and 74) having a value of zero. In this case, the ATM cell 60 is ignored and no credit is sent back. However, a null ATM cell 60 may carry a credit, i.e., a non-zero VCI (68 and 70). A transmitted ATM cell 60 is not carrying any credits if its credit VCI (68 and 70) is equal to zero.

If an arriving ATM cell 60 contains a credit for one of the transmit VCs, i.e., credit VCI (68 and 70) not equal to zero, the credit balance of the transmit VC is incremented by one, and, if the VC has been stopped due to a deficiency in credits, the VC is restarted.

Figure 5:
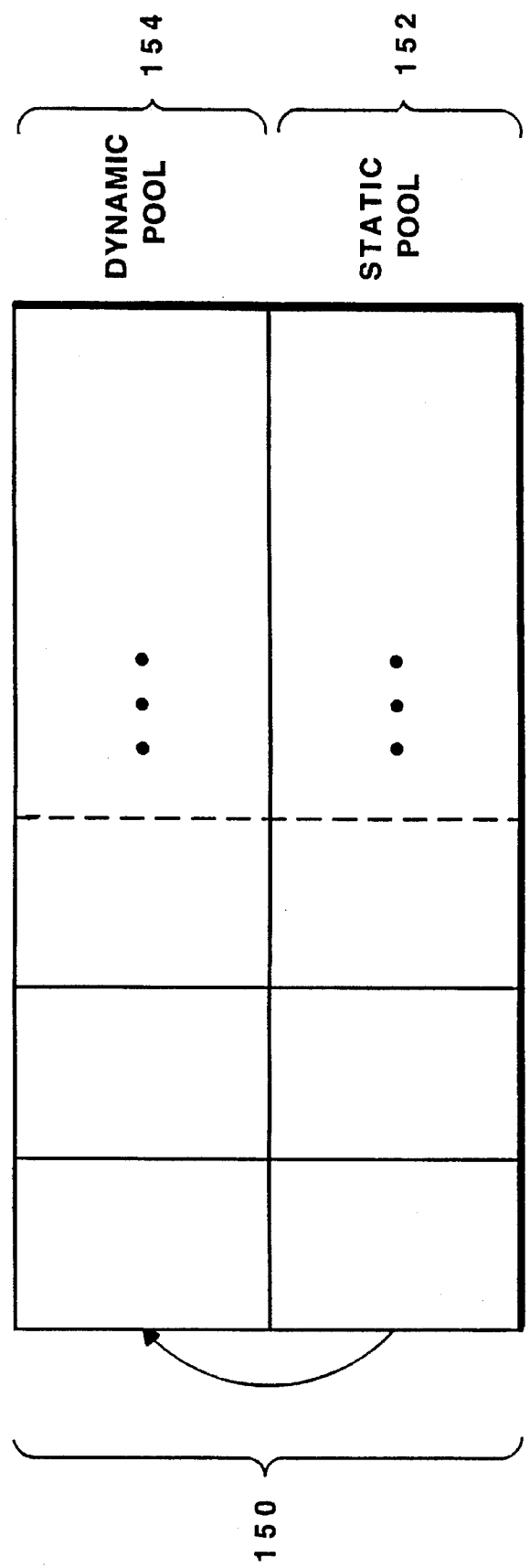
FIG. 5 is block diagram of the local memory of FIG. 4 of the receiver portion of the downstream ATM adapter.

Referring to FIG. 5, the local memory 116 (of FIG. 4) of the receiver portion 118 (of FIG. 4) of the downstream ATM adapter 112 (of FIG. 4) is divided into two buffer pools 150. One of the buffer pools 150 is referred to as a static pool 152. The static pool 152 is used to accommodate the reception of ATM cells from all VCs, as long as these VCs share a positive balance of credits. The size of the static pool 152 is given the limit on the minimum memory size the downstream ATM adapter 112 needs to have as buffering in its local memory 116. The initial size of the static pool 152 is determined by taking the sum across all VCs of the number of VCs times the number of initial credits per VC. The number of initial credits for each VC is typically set to be sufficient for the VC to flow at the full link rate, and the credit for the first cell sent in a given burst of cells has its credits returned to the sender before the sender exhausts its "initial credits," if there is no contention from any other VC on the link. This static pool 152 includes empty ATM cell buffers that are used to store ATM cells arriving from the transmitter portion 102 of the upstream ATM switch 100 even when the transmitter portion 110 of the downstream ATM adapter 112 stops sending credits for those received ATM cells due to congestion. The transmitter portion 102 of the upstream ATM switch 100 will stop sending cells to the downstream ATM adapter 112 only when it has used up all of its credits which were initially given.

One of the buffer pools 150 is referred to as a dynamic pool 154. The dynamic pool 154 is used to reassemble the packets.

Figure 6:
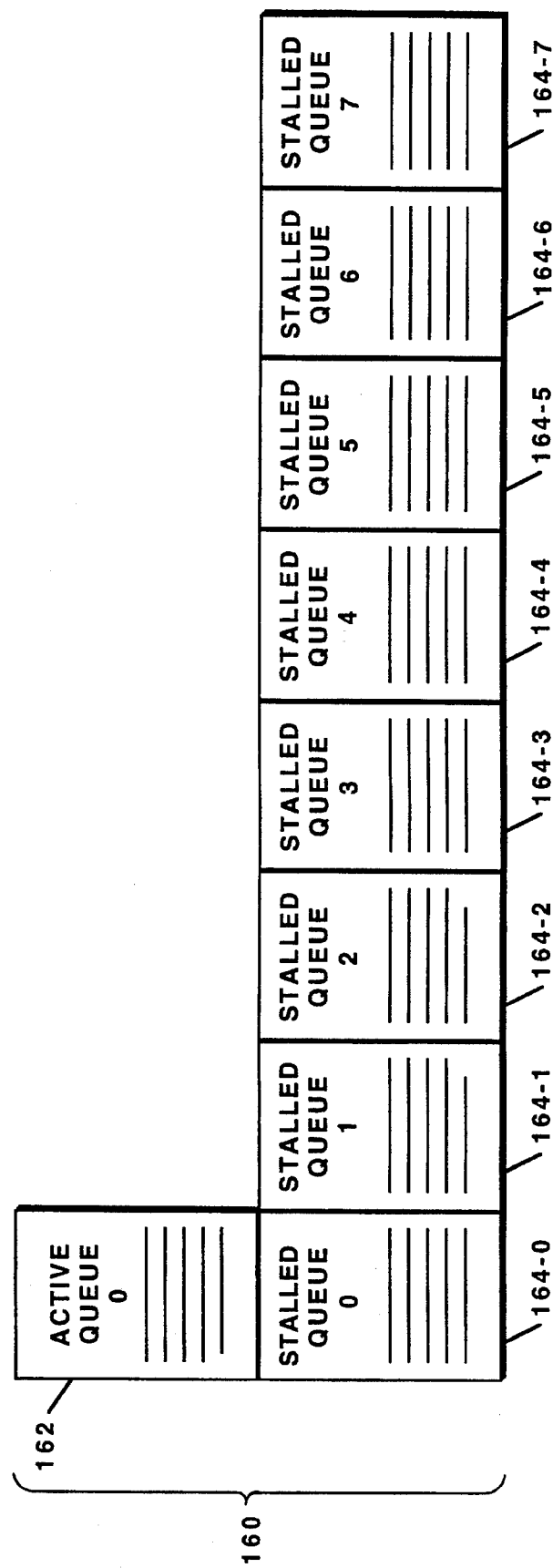
FIG. 6 is a block diagram showing a plurality of queues in the local memory of the receiver portion of the downstream ATM adapter of FIG. 4.

Referring to FIG. 6, receiver portion 118 of the downstream ATM adapter 112 has nine queues 160 for packet reassembly implemented in its local memory 116. The nine queues 160 consist of one active queue 162 and eight stalled queues labeled as 164-0, 164-1, 164-2, 164-3, 164-4, 164-5, 164-6, and 164-7, respectively. There are eight receive host memory queues that are independent of any association with the "stalled queues." When a packet is reassembled, it is just placed on one of the receive host queues.

When the downstream ATM adapter 112 receives in its receiver portion 118 a first ATM cell 104 for a certain VC (VC 106 for example), the downstream ATM adapter 112 has two choices. The downstream ATM adapter 112 may enqueue this VC 106 into the active queue 162, or the downstream ATM adapter 112 may enqueue this VC 106 into one of the eight stalled queues (for example, if a packet has to be placed in a stalled queue, the queue that is chosen to be placed on is based on the VC that it is received on).

The transmitter portion 110 of the downstream ATM adapter 112 will always return credits to a VC which is placed in the active queue 162. As long as the VC is queued in the stalled queue (164-0, for example), credits will be kept in the downstream ATM adapter 112 and will be returned to the upstream switch 100 only when the VC is dequeued from stalled queue 164-0 and enqueued into the active queue 162.

The conditions by which a VC queued in a stalled queue 164-0 is moved to the active queue 162 will be discussed below.

As mentioned above, for each of the eight host receive queues the downstream ATM adapter has a receive cell buffers pool 150 (of FIG. 5) divided into a dynamic pool 154 and a static pool 152. The dynamic pool 154 is used when the VC is in the active queue 162 and the static pool 152 is used when the VC is in the stalled queue.

As is discussed with reference to FIG. 4, when the upstream ATM switch 100 sets up a flow-controlled connection (VCI 106, for example) with the downstream adapter 112, the downstream adapter 112 sends an initial credit balance so that the upstream adapter 112 can start sending cells. This credit balance is what the upstream node will have in order to transmit ATM cells to the downstream node when it is not sending any ATM cells and all credits have returned (i.e. the virtual circuit is idle on that hop). This credit balance comes from the static pool 152, which must be large enough to cover all of the credit balances for all the potentially simultaneous open connections.

If ICB represents the initial credit balance, and if CIF equals the number of cells in flight from the upstream node to the downstream node plus acknowledgements awaiting at the downstream node to be sent back to the upstream node, plus acknowledgements in flight from the down stream node to the upstream node, then ICB equals CIF plus Current_Credit_Balance_at_Transmitter.

Referring again to FIG. 4, the local memory 116 of the downstream ATM adapter 112 maintains a list of supported VCs in a descriptor entry called VC entry (VCE) 136. The VCE entry 136 contains information about the reassembled packet. The VCE entry 136 also contains two pointers which are used to form a doubly linked list of VCEs (oldest VC first, youngest VC last) and by which either the active queue 162 or the stalled queue (164-0 through 164-7) is constructed.

Figure 7:
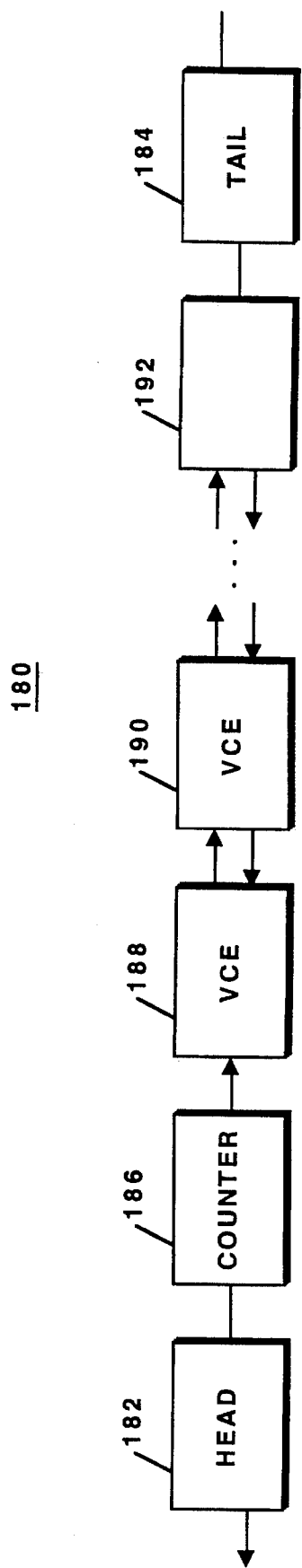
FIG. 7 is a block diagram of an exemplary doubly linked list queue of VCEs.

Referring to FIG. 7, an exemplary doubly linked list queue of VCEs 180 is shown to include a head 182, a tail 184, and a counter entry 186. The counter entry 186 is used to indicate how many VCEs are located in the exemplary doubly linked list queue of VCEs 180. In FIG. 7, three VCEs entries are shown labeled as 188, 190, and 192, respectively. After the conditions for the VCE 188 are met (more fully described below), it can be moved to the active queue 162. Only then will the conditions for the next VCE 190 in queue 180 be examined with regard to moving it to the active queue.

When an ATM cell for a VC is received by a receiver portion 118 of the downstream ATM adapter 112, the VC may be in the stalled queue, 164-0 for example, or not queued at all. If the VC is not queued, it will be queued as the youngest element 192, for example, in either the active queue 162 or the stalled queue 164-0.

If there is more than one queue that has the correct conditions to move an entry into the active queue 162, the stalled queues are selected according to a first in first out (FIFO) arbitration scheme, i.e., the oldest VCE 188 is dequeued from the selected stalled queue and is enqueued as the youngest element in the active queue 162.

Each of the VCEs 186, 188, 190, and 192 contain three indicator variables. A first indicator variable is referred to as a VC_queue variable and may be assigned one of three values. A VC_queue variable with a value of "00" indicates that the VC is not queued at all. A VC_queue variable with a value of "01" indicates that the VC is queued in a stalled queue. A VC_queue variable with a value of "10" indicates that the VC is queued in the active queue. The downstream ATM adapter 112 will only return credits 122 to the upstream ATM switch 100 if the VC is queued to the active queue 162, i.e., that the VC_queue variable has a value of "10".

A second indicator variable is referred to as a VC_credit_count variable. The VC_credit_count variable counts the number of ATM cells which the downstream ATM adapter 112 has received for this VC while it was queued in the stalled queue. The value of the VC_credit_count variable is the number of credits the downstream ATM adapter 112 did not return for that VC. These credits will ultimately be returned when the VC transitions into the active queue.

A third indicator variable is referred to as a VC_count variable. The VC_count variable represents the number of ATM cells received which belong to the same packet, which is currently being assembled.

The three indicator variables, i.e., VC_queue, VC_credit_count, and VC_count, are used in the following manner. For each queue, the downstream ATM adapter 112 counts the exact number of buffers used from both the dynamic pool 154 and the static pool 152. The downstream ATM adapter 112 also keeps a "commitment" counter which counts how many cell buffers the downstream ATM adapter 112 is committed for. Before each packet is enqueued into the active queue 162, the downstream ATM adapter 112 checks if it has enough buffering in its local memory 116 for receiving the maximum packet length possible on that queue. If the downstream ATM adapter 112 has enough buffering in its local memory 116, it "marks" these buffers as committed and treats them as being utilized.

There are three points in time where the downstream ATM adapter 112 might activate a VC. A first point in time is when the packet is moved into the active queue 162. The downstream ATM adapter 112 commits to accommodate for the maximum packet length on this queue.

A second point in time is when the packet reassembly has been completed but not sent out to host memory. The downstream ATM adapter 112 adjusts a committed buffers counter so that it reflects the actual packet size if the received packet size is less than the maximum packet size possible on this VC. Thus, the committed buffers counter is adjusted by subtracting the value [(Max_pkt_size)− (the_size_of_the_received_pkt)].

A third point in time when the downstream ATM adapter 112 activate the next VC (VC 188 in FIG. 7) is when the packet has completed reassembly and is stored to host memory. The downstream ATM adapter 112 frees up the cell buffers in its local memory 116 for that packet. Thus, the free buffers counter is adjusted, i.e., incremented, with the_size_of_the_received_pkt.

The downstream ATM adapter 112 will decide to activate a VC according to the difference between the free buffers counter, and the committed, the static and the max_pkt_size buffers. Activating a VC refers to the process of enqueuing a VC to the active queue 162. A VC may be activated after it is dequeued from the stalled queue, or if the first ATM cell of the packet is received and the VC is idle, and there is enough buffers in the free dynamic memory pool to accommodate a maximum size packet from that VC.

For each queue the downstream ATM adapter 112 maintains four variables stored in its local memory 116. A first variable is referred to as a free_buffers variable. The free_buffers variable contains a value which represents the sum of the dynamic pool 154 buffers and the static pool 152 buffers for all VCs destined to this queue.

A second variable is referred to as a static_buffers variable. The static_buffers variable contains a value which represents the number of static buffers pool 152 across all VCs destined to this queue.

A third variable is referred to as a committed_buffers variable. The committed_buffers variable contains a value which represents the number of ATM cell buffers the downstream ATM adapter has committed to. This value is initialized to zero and for each packet moved into the active queue 162, the committed_buffers variable is incremented to accommodate for the maximum packet length possible on this VC, i.e., max_pkt_len.

A fourth variable is referred to as a max_pkt_len variable. The max_pkt_len variable contains a value which represents the maximum packet length on a group of VCs destined to this queue.

Buffer and credit management in the downstream ATM adapter 112 operates according to the following rules:

---
Rule 1 (first ATM cell)
---

For a first ATM cell received do:
If VC_Count = 0 then:
    If (free_buffers − committed_buffers − max_pkt_len) >
    (static_buffers) do:
      enqueue the VC to active queue
      committed_buffers = committed_buffers + max_pkt_len
    else do:
      enqueue the VC to the stalled queue ---
Rule 2 (Every ATM cell)
---

For every ATM cell do:
    free_buffers = free_buffers − 1
    VC_count = VC_count + 1
    If the VC is in the active queue do:
      committed_buffers = committed_buffers − 1
    If the VC is in the stalled queue do:
      static_buffers = static_buffers − 1
      VC_credit_count = VC_credit_count +1

---
Rule 3 (Last ATM Cell)
---

After the downstream ATM adapter 112 receives the last ATM cell do:
    if the VC is in the active queue 162, do:
    committed_buffers = committed_buffers − max_pkt_len
    + VC_count
    VC_count = 0
Dequeue the VC from the active queue ---
Rule 4 (when storing a packet in host memory)
---

After the downstream ATM adapter 112 stores a packet in host memory, the number of cell buffers freed, i.e., the actual packet length, are added to free_buffers.

---
Rule 5 (when to activate a stalled queue)
---

If the packet has completed reassembly the downstream ATM adapter can activate a stalled VC if:
    free_buffers − committed_buffers − (maximum value of
    VC_Credit_count) > static_buffers
If the packet has not completed reassembly, the downstream ATM adapter can activate a VC if:
    free_buffers − committed_buffers − (maximum value of
    VC_credit_count) − (max_pkt_len − VC_count))>
    static_buffers ---
Rule 6 (When activating a stalled queue)
---

Figure 8:
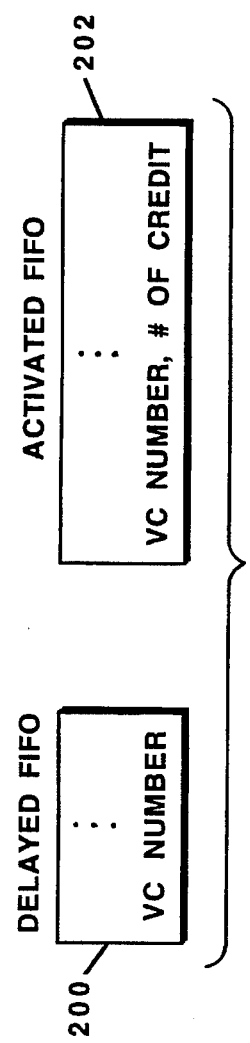
FIG. 8 is a block diagram of the FIFO queues used by the credit return mechanism of the downstream ATM adapter of FIG. 4.

To activate a VC, do:
    static_buffers = static_buffers + VC_credit_count
    Dequeue the VC from stalled queue
If the packet has not completed reassembly do:
    committed_buffers = committed_buffers + max_pkt_len
    − VC_count Referring to FIG. 8, the credit return mechanism 122 (of FIG. 4) of the downstream ATM adapter 112 utilizes two first-in-first-out (FIFO) queues. A first FIFO is referred to as a credit delayed FIFO 200. The credit delayed FIFO 200 is used to store credits that are delayed. Only one credit may be returned in one ATM cell. Whenever the downstream ATM adapter 112 returns credits from an activate FIFO 202 (discussed below), the flow of returning credits for VCs in the active queue 162 are temporarily put in the credit delayed FIFO 200. The credit delayed FIFO 200 holds the VC number as the credit.

The activate FIFO 202 is used to store credits that are scheduled to be returned when the VC was moved from the stalled queue 164 to the active queue 162. All the credits that were placed in the stalled queue 164 are put into one entry in the activate FIFO 202. An entry of the activate FIFO 202 holds the VC number and VC_credit_count values.

In operation, the downstream ATM adapter 112 will use an arbiter to determine from which FIFO to return credits. The arbiter uses a dynamic 1-of-N arbitration (1 from activate FIFO 202, N from delayed FIFO 200), where N is increasing as the number of entries in the delayed FIFO 200 is increasing. This gives to the delayed FIFO 200 a fair share of the returned credit bandwidth.

The dynamic 1-of-N arbitration works as follows. As long as the delayed FIFO 200 has less than or equal to 56 credits stored, for every credit returned from the activate FIFO 202, 32 credits will be returned from the delayed FIFO 200. As long as the delayed FIFO 200 has more than 56 and less than or equal to 4K credits stored, for every credit will be returned from the activate FIFO 202, 64 credits will be returned from the delayed FIFO 200. As long as the delayed FIFO 200 has more than 4K and less than or equal to 8K credits stored, for every credit returned from the activate FIFO 202, 128 credits will be returned from the delayed FIFO 200. As long as the delayed FIFO 200 has more than 8K and less than or equal to 16K credits, for every credit returned from the activate FIFO 202, 256 credits will be returned from the delayed FIFO 200. If there are more than 16K credits in the delayed FIFO 200, credits will return only from the delayed FIFO 200.

Referring again to FIG. 4, the upstream ATM switch 100 will continue to move ATM cells on VCI 106 to the downstream ATM adapter 112 as long as long as the upstream ATM switch 100 contains a credit 126 for VCI 106. As mentioned previously, a plurality of events may occur in the upstream ATM switch 100 or the link that may lead to a lack of synchronization between the upstream switch 100 and the downstream adapter 112. This may reduce the number of credits that the ATM switch 100/ATM adapter 112 may use, causing inefficient use of the link. In some cases, the number of credits available to the ATM switch 100 may in fact reduce to zero and hence, the upstream ATM switch 100 will cease transmitting ATM cells, ATM cell 104 for example, to the downstream ATM adapter 112. If any one of these plurality of events occurs, and leads to a credit balance of zero, a resynchronization of ATM credits will be needed before the upstream ATM switch 100 continues to transmit ATM cells on VCI 106 to the downstream ATM adapter 112. If any one of these plurality of events occurs and leads to a loss of synchronization, but not a credit balance of zero, then the upstream node can continue to transmit ATM cells, although inefficiently. Thus, a process of indicating that resynchronization should be initiated in response to one of the plurality of events is required.

In order to anticipate if one of the exemplary events occurred, the ATM switch 100 and the ATM adapter 112 are periodically synchronized by the use of a timer. The upstream ATM switch 100 or the ATM adapter 112 uses a timer to lead to a resynchronization request. When the interaction between the upstream ATM switch 100 and the downstream ATM adapter 112 is ongoing for the period of the timer for the transmission of ATM cells and the expiration of the timer occurs, a resynchronization request, fully described below with reference to FIG. X, will be generated in the upstream ATM switch 100, and the timer reset.

Another exemplary manner of initiating a resynchronization request in the upstream ATM switch 100 or the ATM adapter is based on the total number of ATM cells being sent from the upstream ATM switch 100 to the downstream ATM adapter 112. In general, the more ATM cells being transmitted from the upstream ATM switch 110 to the downstream ATM adapter 112, the more often a resynchronization request should be sent from the upstream ATM switch 100 to the downstream ATM adapter 112, as the probability that an ATM cell is lost increases.

An exemplary event which may occur in the downstream ATM adapter 112 and lead to a resynchronization request is any indication that ATM cells are lost for the VCI 106. For example, the physical layer on the downstream ATM adapter 112 may indicate that a particular ATM cell is in error. This may be indicated when the cell header 62 (of FIG. 3) is recognized as being in error.

Another exemplary event which may occur in the downstream ATM adapter 112 and lead to a resynchronization request is when a packet is received with a length error. The length error will indicate that an ATM cell was lost, however not necessarily on this hop.

Another exemplary event which may occur in either the upstream ATM switch 100 or the downstream ATM adapter 112 and lead to a resynchronization request is when either the upstream ATM switch's 100 physical layer or the downstream ATM adapter's 112 physical layer indicates that the link has failed.

Another exemplary event which may occur in the upstream ATM switch 100 and lead to a resynchronization request is an indication from the upstream ATM switch 100 that the VCI 106 has zero credits for some duration of time.

Still another exemplary event which may occur in the upstream ATM switch 100 and lead to cancellation of a potential resynchronization request is when a VCI 106 is idle or if the ATM credits in the upstream ATM switch 100 or in the downstream ATM adapter 112 are full. This situation should result in the sending of no resynchronization request from the upstream ATM switch 100 to the downstream ATM adapter 112.

When the downstream ATM adapter 112 initiates a credit resynchronization transaction, it is required that the VCI 106 for which the resynchronization is taking place has no cells in progress. This is because a credit resynchronization initiator, fully described with reference to FIG. 9, has to stop transmitting ATM cells of a VCI 106 before sending a credit resynchronization request. This is best accomplished by the downstream ATM adapter 112 ensuring that no packets or cells have been queued in the downstream ATM adapter 112 for that VCI 106 before transmitting a credit resynchronization request message. For example, a means for initiating a credit resynchronization is to have processed the last transmit completion for that VCI 106 and then issue the credit resynchronization. However, if there are no packets to transmit and it is time to resynchronize the VCI 106, then the present invention incorporates a 'chaser' packet for that VCI 106. The chaser packet is a packet that is placed by the host software in the end system on one of the plurality of queues in the downstream ATM adapter 112 to get an indication back that no packets remain for that VCI 106 in the downstream ATM adapter 112.

When the indication that credit resynchronization is needed is provided by the downstream ATM adapter 112 to host software that the downstream ATM adapter 112 has no more packets in it, then the host software may issue a resynchronization request to the upstream ATM switch 100 at the other end of the link. When a resynchronization complete message arrives back from the upstream ATM switch 100, the host 500 writes the originally allocated credit value for that VCI 106 back into the local adapter's data structure (i.e., the ICB value) in the downstream ATM adapter 112, then restarts sending data on that VCI 106.

As is discussed with reference to FIG. 2 and FIG. 3, the ATM cell header contains a plurality of fields. As mentioned previously, initiation of a credit synchronization message resynchronization request message comes from the upstream ATM switch 100. This credit resynchronization request message will be placed in the ATM cell header and, as an example, will be signified by the upstream ATM switch 100 placing a flag "F" in the destination VCI field 72 of FIG. 3. After the upstream ATM switch 100 sends the credit resynchronization message to the downstream ATM adapter 112, no more ATM cells will be transmitted over the VCI, VCI 106 for example, from the upstream ATM switch 100 to the downstream ATM adapter 112 until the downstream ATM adapter 112 sends a credit resynchronization message complete to the upstream ATM switch 100.

ATM SWITCH INITIATED RESYNCHRONIZATION

Figure 9:
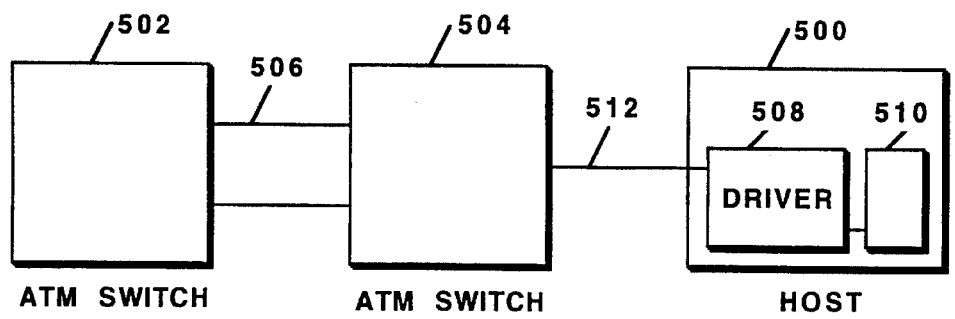
FIG. 9 is a block diagram of an exemplary host to switch interaction.

Referring to FIG. 9, a receiving a credit resynchronization request from a host 500, with a switch 500 initiating credit resynchronization, is shown. FIG. 9 also shows an adapter 504. Prior to sending the credit resynchronization request, the switch 502 will stop transmitting ATM cells to a target VC 506. The switch 502 will send a "credit resynchronization" message on a different VC 506 (i.e., VC F), as an OAM cell. An exemplary message will have the following fields:

Type of Message: Credit Resynchronization Request

VC Credit Resynchronization requested: VC that the credit is to be resynched on

Sequence Number

Credit Resynchronization request originator: Switch ID field or ATM hardware address When the credit resynchronization message arrives, the message is delivered to the host driver 508. This is then delivered through normal processing for that queue, for the well-known VC on to the correct entity to process the resynchronization request by a management entity 510 of the driver 508. The management entity 510 then creates a local request to the adapter 504 to perform a credit resynchronization process. In the preferred embodiment, the management entity 510 will only post one request to the adapter 504 for credit resynchronization at a time. Any subsequent credit resynchronization messages that arrive to the management entity 510 will be queued in the host 500 at the management entity 510. Furthermore, the remote credit resynchronization requestor may retransmit requests, which the management entity 510 can identify as a duplicate and discard. The management entity 510 identifies a credit resynchronization request as a duplicate if it has received a request for that VC 506 for which it has not yet completed processing and transmitted a credit resynchronization complete message. There still exists a problem of the credit resynchronization request and the credit resynchronization complete messages crossing themselves on the wire 512. To avoid this, the concept of a 'sequence number' in the credit resynchronization request message is included. Although, at the outset, the resynchronization request message appears to be idempotent, it may present implementation problems when the resynchronization request and complete messages cross themselves on the wire 512. The reason for this is that the duplicate resynchronization request may initiate another resynchronization process on a receiver, while the sending end begins to believe that the resynchronization process has been completed and starts sending ATM cells. This may also occur because the resynchronization request is on a separate VC, other than the resynched VC. ATM cells of the resynchronized VC 506 that are transmitted by the sender are not anticipated by the receiver, in principle. If the ATM cells on that VC 506 arrived at a time instant after the resynchronization process had made part of its way through the process of resynching, then the accounting of ATM credits would be incorrect. For example, if the ATM cells arrived just after the adapter 504 picked up the credits for the VC 506, put them in the FIFO and was waiting for it to be transmitted. However, if the resynchronization message is on the same VC as the VC being synced up, it does not violate the idempotency problem. However, the sequence number is used for other optimizations that are described more fully below.

The local interface 512 to the adapter 504 is assumed to be the following: credit resynchronization request on VC 506, interrupt on completion.

The adapter 504 is required to provide an indication of credit resynchronization completion back to the host driver 508 when the following are complete:

(a) Acknowledgements (i.e., acks or credits) for all received ATM cells on that VC 506 up to this point have been generated.

(b) Acks generated for that VC 506 have all been transmitted on the 'link'.

In an exemplary implementation of the invention, completion of all the following steps would provide an indication of credit resynchronization completion back to the driver 508:

(i) The VC is no longer in the stalled queue (164 of FIG. 6). A VC remaining in the stalled queue implies that credit acknowledgements for ATM cells remaining in that queue have not been put on an ACK FIFO as yet. Therefore, the acks for this VC have not been 'generated' yet. If a VC is in the active queue (162 of FIG. 6), acks for this VC have been generated, and placed in the Ack. FIFO(s), i.e., delayed and activate FIFOs.

(ii) If the VC is neither in the Active or Stalled Queue, then all the acks. for that VC have been generated. Now, to ensure (b) above, we need to determine that all the acks. for the VC in the FIFOs are returned to the other end of the link. One way for the exemplary embodiment to complete this is to first determine when the VC is no longer in the stalled queue. Then mark the current position of the 'full' position of the ACK FIFOs, and when this position reaches the head of the FIFO and that ack. has been transmitted, then all the acks. for the VC in question have been returned. We need to ensure that all FIFOs that have acks stored in them are accounted for. Therefore, this marking of the current "full" position and waiting for the draining of the ACKs is performed for the Delayed and Activate FIFOs.

(iii) At this point, the host driver 508 is notified that credit resynchronization for that VC has been completed. The indication may or may not require a field to indicate the VC number, as there will be only one VC for which credit resynchronization was requested by the driver at a time. The notification to the host 500 is through an interrupt.

The driver 500 needs to know that this interrupt is due to resynchronization completion. In the implementation of the exemplary embodiment, another event is added in the status block, for indication that the resynchronization was completed, along with the identity of the VC for which this was done. The driver 500, on receiving the credit resynchronization completion notification from the adapter 504, informs the management entity 510, which then transmits a credit resynchronization completed message to the other end of the link. The credit resynchronization completed message has the following fields (on messages arriving on that VC):

Type of Message: Credit Resynchronization completed
VC Credit Resynchronization completed: VC that the credits were resynched on
Sequence Number The credit resynchronization transaction is now complete. Multiple credit resynchronization transactions may be in progress at any one time. However, only one transaction may be in progress between the host 500 and the adapter 504 at a time. In a preferred embodiment, the number of outstanding credit resynchronizations between the initiator and responder should be limited. If ten requests are sent, all the ten VCs are on hold for a long period. Although the time for resynching ten VCs, if these are all sent in a burst, may not take ten times more than a single request (particularly because the time spent in the stalled queue may not, with some reasonable probability, be multiplied ten times). However, the timeout value (described below) would have to take the worst case into account.

The assumption is that if the host 500 takes a long time, suitable timeout mechanisms would have to be implemented in the credit resynchronization process initiator. Upon timeout, the initiator may choose to retransmit a certain number of times, three or four, for example, the resynchronization request. This accounts for recovery when resynchronization requests are lost.

To optimize, the sequence number is used to identify that a resynchronization request or complete message was lost, when there are multiple resynchronization requests outstanding. Instead of timeout, the designer may want to consider the following:

1. It is known that the responder is required to perform the synchronization request in order, on a first come first served basis.

2. The initiator initiates N Resynchronization requests in a 'sliding window' mechanism, with a sequence number to identify them uniquely.

3. The only reason for not getting a response, is either because the request is lost or because the response is lost.

4. If the initiator gets a response for VC x+1, as identified by sequence number of the response being skipped, when expecting a response for x, this is an indication that x is lost. The initiator then starts a retry to resend the request again.

5. The initiator will still have to start a timer, but the timer is much larger, to cover for the case where all N requests were lost (much lower probability), or the responder is off. During this entire period, the initiator does not allow the VC to transmit any further cells, and these continue to remain buffered until they are either removed after a set duration of time, or mechanisms in signalling close the VC.

ATM ADAPTER INITIATED RESYNCHRONIZATION

When the host 500 initiates a credit resynchronization transaction, it is required that the VC for which the resynchronization is taking place has no packets in progress. This is because, fundamentally, the credit resynchronization initiator has to stop transmitting ATM cells of a VC before sending the credit resynchronization request. This is best accomplished by the driver 500 ensuring that no packets or cells have been queued in the adapter 504 (and queued in the driver's interface to the adapter) for that VC before transmitting a credit resynchronization message. The easiest means for initiating a credit resynchronization is to have processed the last transmit completion for that VC and then issue the resynchronization. However, if there are no packets to transmit, but it is time to resynchronize the VC because the VC does not have the full credit value (the driver has to read the credit value for the VC from the ATM adapter before initiating the credit resynchronization), then a 'chaser' packet is incorporated for that VC. This chaser packet is a packet that is placed on the queue to get an indication back that no packets remain for that VC in the adapter 504. The device provides the indication when the 'chaser' gets to the head of the queue. Note that only that VC has to stop transmitting, not all the other VCs on that transmit queue on the ATM adapter. We just stop transmitting on that VC while the others then can have packets queued for transmission. When the device indication of the chaser having reached the head of the queue is received by the host driver 508, the host management entity 510 may then send a credit resynchronization request message to the ATM switch 502 at the other end of the link. The driver 508 is required to no longer queue any packets to the adapter 504 on a VC until a credit resynchronization completed message has been received from the ATM switch 502. When the resynchronization complete message arrives, the driver 508 writes the originally allocated credit value (ICB) for that VC back into the device and then restarts sending data on that VC.

Figure 10:
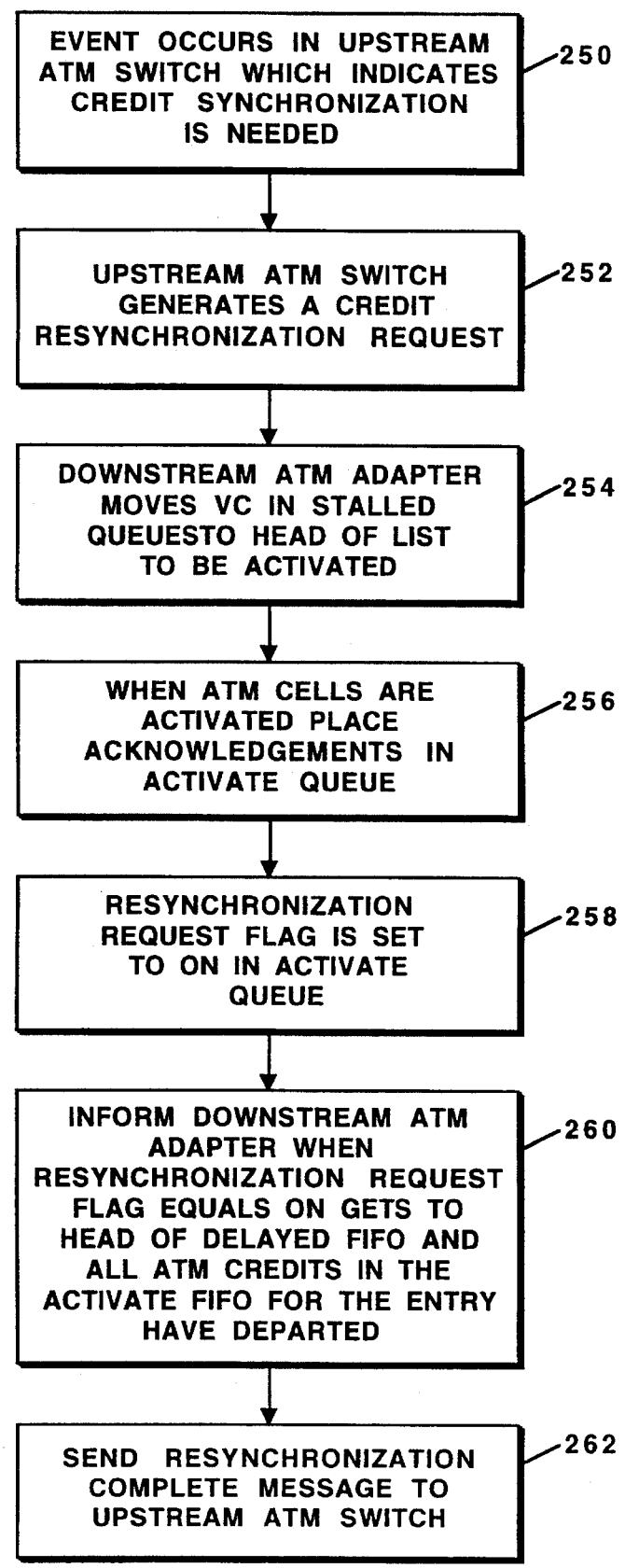
FIG. 10 is a flow chart of an exemplary credit resynchronization method according to one embodiment of the present invention.

Referring to FIG. 10, a flow chart of an exemplary credit resynchronization method is shown according to one embodiment of the present invention. At step 250 one of the plurality of events discussed previously occurs in the upstream ATM adapter. At step 252, the upstream ATM switch generates a credit resynchronization request for a specific VC to the downstream ATM adapter. In response to the credit resynchronization request, at step 254 the downstream ATM adapter moves the VC located in the stalled queue to the head of the list to be activated. At step 256, when the ATM cells are activated, acknowledgements are placed in the activate queue. At step 258 a resynchronization request flag is set to 'ON' in the activate FIFO. At step 260, the downstream ATM adapter is informed when the resynchronization request flag 'ON' gets to the head of the delayed FIFO and all credits in the activate FIFO for the entry depart. At step 262 the downstream ATM adapter indicates to the host driver that the resynchronization is done and then the host driver can send a resynchronization completion message to the upstream ATM switch.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. An asynchronous transfer mode (ATM) network device comprising:

a receiver portion, said receiver portion capable of receiving a plurality of ATM cells on one of a plurality of virtual circuits (VCs) from an upstream ATM switch, the plurality of ATM cells resulting from a disassembly of a plurality of packets in the upstream ATM switch;

a local memory, said local memory used to store the plurality of ATM cells;

means for managing said local memory using a plurality of queues;

means for assembling ATM cells into a plurality of packets in the local memory;

means for transmitting said plurality of packets to a host memory;

means for resynchronizing a plurality of ATM credits, each of said ATM credits representing an available buffer in the local memory to receive an ATM cell; and a transmitter portion, said transmitter portion having a means for indicating said transmitting of said packets to said host memory to said upstream ATM switch.

2. The ATM network device according to claim 1 wherein said local memory further comprises:

a dynamic pool of memory in said local memory, said dynamic pool used to reassemble said plurality of ATM cells into a plurality of packets; and a static pool of memory in said local memory, said static pool used to store said plurality of ATM cells arriving from said upstream ATM switch.

3. The ATM network device according to claim 2 wherein the static pool of memory is sized as a minimum memory size said ATM network device requires to have as buffering in said local memory.

4. The ATM network device according to claim 2 wherein the static pool of memory is sized by taking a product of a number representing a VC and a number of initial credits per VC.

5. The ATM network device according to claim 2 wherein said local memory further comprises a plurality of reassembly queues for packet reassembly.

6. The ATM network device according to claim 5 wherein each of said plurality of reassembly queues comprise:

an active queue;

a plurality of stalled queues; and means for controlling an interaction between said active queue and said plurality of stalled queues.

7. The ATM network device according to claim 6 wherein said plurality of stalled queues comprise eight stalled queues.

8. The ATM network device according to claim 6 wherein said means for controlling said interaction between said active queue and said plurality of stalled queues comprises:

means for receiving said plurality of ATM cells of a first virtual circuit (VC);

means for determining where to place said plurality of ATM cells of said first VC in said plurality of queues; and means for returning an ATM credit to said upstream ATM switch.

9. The ATM network device according to claim 8 wherein one of said plurality of ATM credits is returned to said upstream ATM switch when said VC is placed in said active queue.

10. The ATM network device according to claim 8 wherein one of said plurality of ATM credits is stored in said local memory while said ATM cell of the VC is stored in one of said stalled queues.

11. The ATM network device according to claim 10 wherein said ATM credit is returned to said upstream ATM switch when said ATM cell of the VC is dequeued from said one of said stalled queues and enqueued to said active queue.

12. The ATM network device according to claim 8 wherein said means for determining comprises:
   means for storing in said local memory a list of supported VCs in a descriptor entry, said descriptor entry containing two pointers, said pointers used to form a doubly-linked list by which said active queue and said plurality of stalled queues are constructed, said descriptor entry having a counter entry, said counter entry used to indicate the number of VC in said doubly-linked list, said descriptor entry having a plurality of indicator variables;
   means for receiving a first VC;
   means for placing said first VC in said active queue;
   means for placing said first VC in one of said plurality of stalled queues; and
   means for moving said first VC in said one of said plurality of stalled queues to said active queue.

13. The ATM network device according to claim 12 wherein said plurality of indicator variables comprise:
   a VC queue variable, a value of said VC queue variable indicating whether said first VC is not queued at all, whether said first VC is queued in said active queue, and whether said first VC is queued in one of said plurality of said stalled queues;
   a VC credit count variable, said VC credit count variable indicating the number of ATM cells which said ATM device has received on said VC while queued in one of said plurality of said stalled queues;
   a VC count variable, said VC count variable indicating the number of ATM cells received by said ATM network device which belong to said VC; and
   a commitment counter, said commitment counter indicating the number of memory buffers the ATM network device is committed for.

14. The ATM network device according to claim 13 wherein said means for controlling said interaction between said active queue and one of said plurality of stalled queues further comprises:
   means for checking an initial available buffer size of said local memory;
   means for marking said initial available buffer size as committed; and
   means for changing said initial available buffer size, said means for changing comprising the steps of:
      committing a maximum packet on said VC when said packet is moved from one of said stalled queues to said active queue;
      adjusting said size by the size of the received packet if the packet has not been sent to said host memory to the difference between said maximum packet size and said size of said received packet size; and
      adjusting said size of said received packet if said packet is ready to be sent to said host memory and has not been sent to said host memory by said received packet.

15. The ATM network device according to claim 14 wherein said plurality of indicator variables further comprise:
   a free buffers variable, said free buffers variable containing a value which represents the sum of the dynamic pool of memory and the static pool of memory for all VCs destined to said active queue;
   a static buffers variable, said static buffers variable containing a value which represents a number of static pool of memory across all of said VCs destined to said active queue;
   a committed buffers variable, said committed buffers variable containing a value which represents a number of ATM cell buffers said ATM network device has committed to; and
   a maximum packet length variable, said maximum packet length variable containing a value which represents a maximum packet length on a plurality of VCs destined to said active queue.

16. The ATM network device according to claim 13 further comprising:
   means for managing said plurality of static pool of memory and dynamic pool of memory; and
   means for managing a return of credits from said transmitter portion to said upstream ATM switch.

17. The ATM network device according to claim 16 wherein said means for managing said plurality of static pool of memory and dynamic pool of memory comprises means for responding to the movement of one of said plurality of ATM cells, said means for responding operating according to a plurality of rules.

18. The ATM network device according to claim 17 wherein said plurality of rules comprise:
   a first rule, said first rule applied if said received ATM cell is a first ATM cell;
   a second rule, said second rule applied for every received ATM cell;
   a third rule, said third rule applied if said received ATM cell is said last ATM cell received;
   a fourth rule, said fourth rule applied when storing one of said plurality of packets in said host memory;
   a fifth rule, said fifth rule applied when determining when to activate one of said stalled queue; and
   a sixth rule, said sixth rule applied when activating said one stalled queue.

19. The ATM network device according to claim 18 wherein said first rule comprises the steps of:
   determining whether a value of said free buffers variable minus said committed buffers variable minus said maximum packet length variable is greater than said value of said static buffers variable;
   enqueuing said first ATM cell to said stalled queue if said value is not greater than said value of said static buffers variable; and
   enqueuing said VC to said active queue if said value is greater than said value of said static buffers variable.

20. The ATM network device according to claim 18 wherein said second rule comprises the steps of:
   decrementing said free buffers variable by one;
   incrementing said VC count variable by one;
   decrementing said committed buffers variable by one if said VC is in said active queue;
   decrementing said static buffers by one if said VC is in said stalled queue; and
   incrementing said VC credit count variable by one if said VC is in said stalled queue.

21. The ATM network device according to claim 18 wherein said third rule comprises the steps of:
   assigning said committed buffers variable the value of the committed buffers variable minus said maximum packet length variable plus said VC count variable if said VC is in said active queue; and setting the VC count variable equal to zero if said VC is in said active queue.

22. The ATM network device according to claim 18 wherein said fourth rule comprises the step of adding the number of cell buffers freed to said free buffers variable.

23. The ATM network device according to claim 18 wherein said fifth rule comprises the steps of:

activating a VC if the value of free buffers minus committed buffers minus said maximum value of said VC credit count variable is greater than the value of said static buffers variable; and activating a VC if the value of free buffers minus committed buffers minus said maximum value of said VC credit count variable minus said maximum packet length minus said VC Count variable is greater than the value of said static buffers variable.

24. The ATM network device according to claim 18 wherein said sixth rule comprises the steps of:

setting the value of said static buffers variable to said static buffers variable plus said VC credit count;

dequeuing said VC from stalled queue; and setting the value of said committed buffers variable to committed buffers variable plus said maximum packet length variable minus aid VC count variable if aid packet has not completed reassembly.

25. The ATM network device according to claim 16 wherein said means for managing a return of credits from said transmitter portion to said upstream ATM switch comprises:

a plurality of first-in-first out (FIFO) queues, a first FIFO queue used to store a plurality of credits scheduled to be returned, a second FIFO queue used to store aid VC number as a credit; and arbitration means to determine from which of said FIFOs to return credits.

26. The ATM network device according to claim 25 wherein said arbitration means comprises a 1-of-N arbitration method.

27. The ATM network device according to claim 13 wherein the means for resynchronizing the plurality of credits comprises:

means for detecting in said transmitter portion a plurality of events which indicate ATM credit resynchronization;

means for generating a credit resynchronization request in said transmitter portion in response to said means for detecting;

means for sending said credit resynchronization request to said receiver portion;

means for moving a selected virtual circuit in one of the plurality of stalled queues to the head of said queue;

means for acknowledgements in said activate queue;

means for setting a resynchronization flag to "ON" in said activate queue;

means for informing said receiver portion when said resynchronization flag is "ON";

means for informing said receiver portion when a plurality of ATM credits have departed from said activate queue; and means, in said receiver portion, for sending a resynchronization complete message to said transmitter portion.

* * * * *